United States Patent
Snider et al.

(10) Patent No.: US 8,844,295 B2
(45) Date of Patent: Sep. 30, 2014

(54) METHOD FOR MEETING A PURGE FLOW REQUIREMENT FOR A POWER PLANT AND A POWER PLANT HAVING A PURGE CONTROL SYSTEM

(75) Inventors: David August Snider, Simpsonville, SC (US); Christopher John Morawski, Albany, NY (US)

(73) Assignee: General Electric Company, Schenectady, NY (US)

( * ) Notice: Subject to any disclaimer, the term of this patent is extended or adjusted under 35 U.S.C. 154(b) by 368 days.

(21) Appl. No.: 13/342,559

(22) Filed: Jan. 3, 2012

(65) Prior Publication Data
US 2013/0167550 A1 Jul. 4, 2013

(51) Int. Cl.
*F02C 7/26* (2006.01)
*F01D 19/00* (2006.01)

(52) U.S. Cl.
USPC .............................. 60/778; 60/39.094; 60/786

(58) Field of Classification Search
CPC ... F23R 3/10; F23D 2209/30; F23N 2027/04; F23N 2027/06; F23N 2041/20; F02C 7/26; F01D 19/00
USPC .................. 60/39.094, 786, 772–783, 790
See application file for complete search history.

(56) References Cited

U.S. PATENT DOCUMENTS

| | | | |
|---|---|---|---|
| 5,042,246 A * | 8/1991 | Moore et al. | 60/773 |
| 6,095,793 A * | 8/2000 | Greeb | 60/39.822 |
| 6,847,129 B2 * | 1/2005 | McKelvey et al. | 290/52 |
| 7,861,532 B2 * | 1/2011 | Law et al. | 60/772 |
| 8,555,653 B2 * | 10/2013 | Snider et al. | 60/778 |
| 2006/0283193 A1 * | 12/2006 | Nilsson | 60/776 |
| 2009/0145104 A1 * | 6/2009 | Alexander et al. | 60/39.182 |
| 2011/0146292 A1 * | 6/2011 | Grant et al. | 60/778 |

* cited by examiner

*Primary Examiner* — J. Gregory Pickett
(74) *Attorney, Agent, or Firm* — Cantor Colburn LLP

(57) ABSTRACT

A method of delivering a purge flow through a gas turbomachine includes generating a purge flow, guiding the purge flow through at least one of a combustor assembly and a turbine portion of the gas turbomachine, determining a cumulative purge volume passing through the one of the combustor assembly and the turbine portion of the gas turbomachine to determine a predetermined purge volume, and discontinuing the purge flow once the predetermined purge volume has passed through the one of the combustor assembly and the turbine portion of the gas turbomachine.

21 Claims, 2 Drawing Sheets

METHOD FOR MEETING A PURGE FLOW REQUIREMENT FOR A POWER PLANT AND A POWER PLANT HAVING A PURGE CONTROL SYSTEM

BACKGROUND OF THE INVENTION

The subject matter disclosed herein relates to the art of power plants and, more particularly, to method of meeting a purge flow requirement for a power plant.

Prior to light off or ignition, a gas turbomachine (GT) undergoes a purge cycle to expel combustible gases from non-combustion portions of the system. Conventional systems define the purge cycle in terms of purge time at a predetermined purge speed. During a purge cycle, air is introduced into the GT. Once firing speed is achieved, a timer is initiated. The GT continues to accelerate to purge speed and the purge cycle then continues until a predetermined time has passed. Once the predetermined time has passes, the GT typically decelerates to firing speed. Generally, a lower airflow passed through the system while accelerating from firing speed to purge speed is compensated for by the additional airflow after the timer has stopped and the GT decelerates from purge speed to firing speed.

BRIEF DESCRIPTION OF THE INVENTION

According to one aspect of the exemplary embodiment, a method of meeting a purge flow requirement for a gas turbomachine includes generating a purge flow, guiding the purge flow through at least one of a combustor assembly and a turbine portion of the gas turbomachine, determining a cumulative purge volume passing through the one of the combustor assembly and the turbine portion of the gas turbomachine to meet a predetermined purge volume, and discontinuing the purge flow once the predetermined purge volume has passed through the one of the combustor assembly and the turbine portion of the gas turbomachine.

According to another aspect of the exemplary embodiment, a method of meeting a purge flow requirement for a power plant includes generating a purge flow in a gas turbomachine, guiding the purge flow from the gas turbomachine into a heat recovery steam generator (HRSG) fluidly coupled to the gas turbomachine, determining a cumulative purge volume passing through the HRSG to meet a predetermined purge volume, and discontinuing the purge flow once the predetermined purge volume has passed through the HRSG.

According to yet another aspect of the exemplary embodiment, a turbomachine includes a compressor portion, a turbine portion operatively connected to the compressor portion, a combustor assembly fluidly connected to the compressor portion and the turbine portion, and an adaptive purge control system operatively connected to at least the compressor portion. The purge control system being configured and disposed to adaptively deliver a defined volume of purge flow through the turbine portion.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
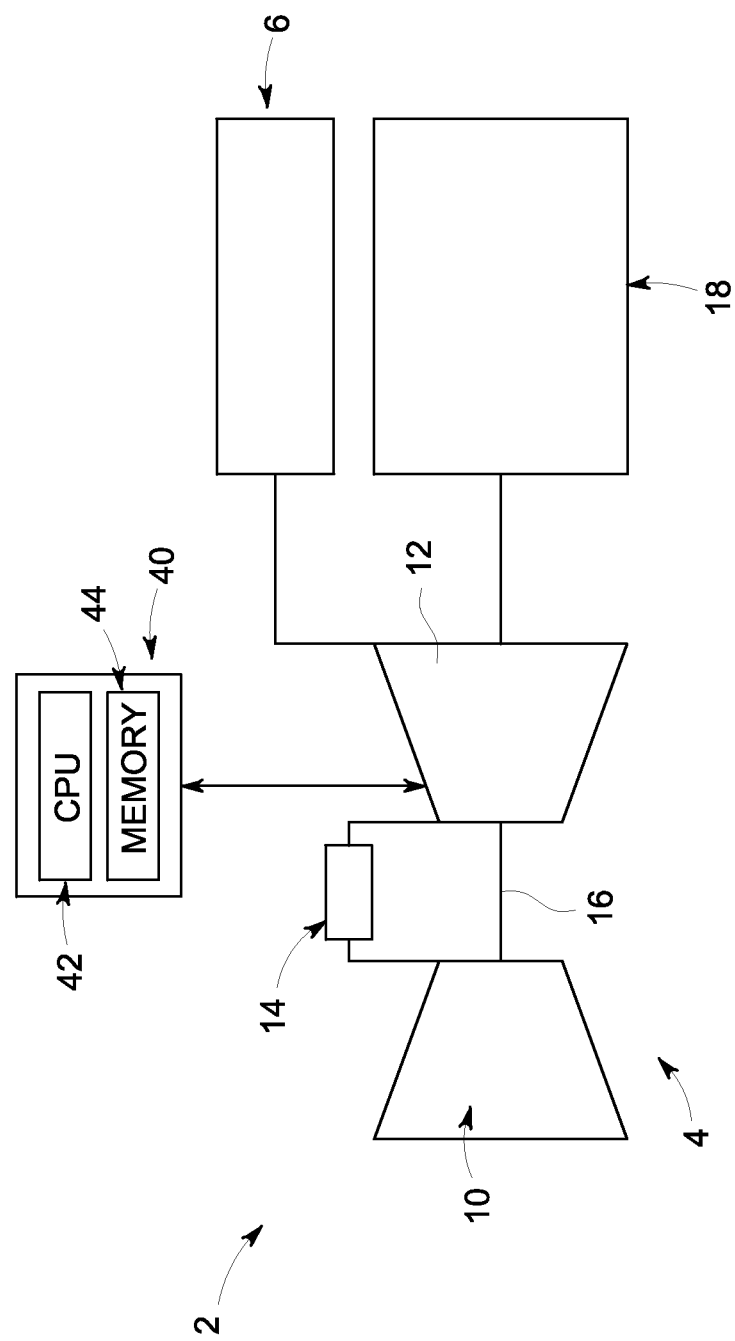
FIG. 1 is a schematic view of a combined cycle power plant including a gas turbomachine fluidly connected to a heat recovery steam generator (HRSG), including a purge control system in accordance with an exemplary embodiment.

With reference to FIG. 1, a combined cycle power plant (CCPP) in accordance with an exemplary embodiment is indicated generally at 2. CCPP 2 includes a gas turbomachine 4 fluidly coupled to a heat recovery steam generator (HRSG) 6. Gas turbomachine 4 includes a compressor portion 10 fluidly connected to a turbine portion 12 through a combustor assembly 14. Compressor portion 10 is also mechanically linked to turbine portion 12 through a common compressor/turbine shaft 16. Compressor portion 4 is also mechanically linked to a generator 18 and fluidly coupled to HRSG 6. At this point it should be understood that while described as being associated with a steam turbine, CCPP 2 may form part of configurations including those that do not employ a steam turbine. It should also be understood that CCPP 2 includes an exhaust system (not shown).

Compressor portion 10 delivers compressed air to combustor assembly 14 to be mixed with fuel to form a combustible mixture. The combustible mixture is combusted within combustor assembly 14 to form hot gases that are delivered to turbine portion 12 through a transition piece (not shown). The hot gases expand through turbine portion 12 creating work that is employed to drive, for example, generator 18. Exhaust gases pass from turbine portion 12 to HRSG 6. The exhaust gases pass in a heat exchange relationship with fluids in HRSG 6. For example, the exhaust gases form steam that is used to drive a steam turbomachine (not shown).

Prior to combusting the combustible mixture, turbine portion 12 and HRSG 6 are purged of any combustible/gases that may ignite in regions of CCPP 2 not designed for combustion. In accordance with the exemplary embodiment, CCPP 2 includes an adaptive purge control system 40. Adaptive purge control system 40 includes a central processor unit 42 and a memory 44 that are configured to control a purge cycle in CCPP 2. In accordance with one aspect of the exemplary embodiment, adaptive purge control system 40 controls the purge cycle such that purge flow ends substantially, simultaneously, with turbine portion 12 reaching firing speed as will be discussed more fully below.

Figure 2:
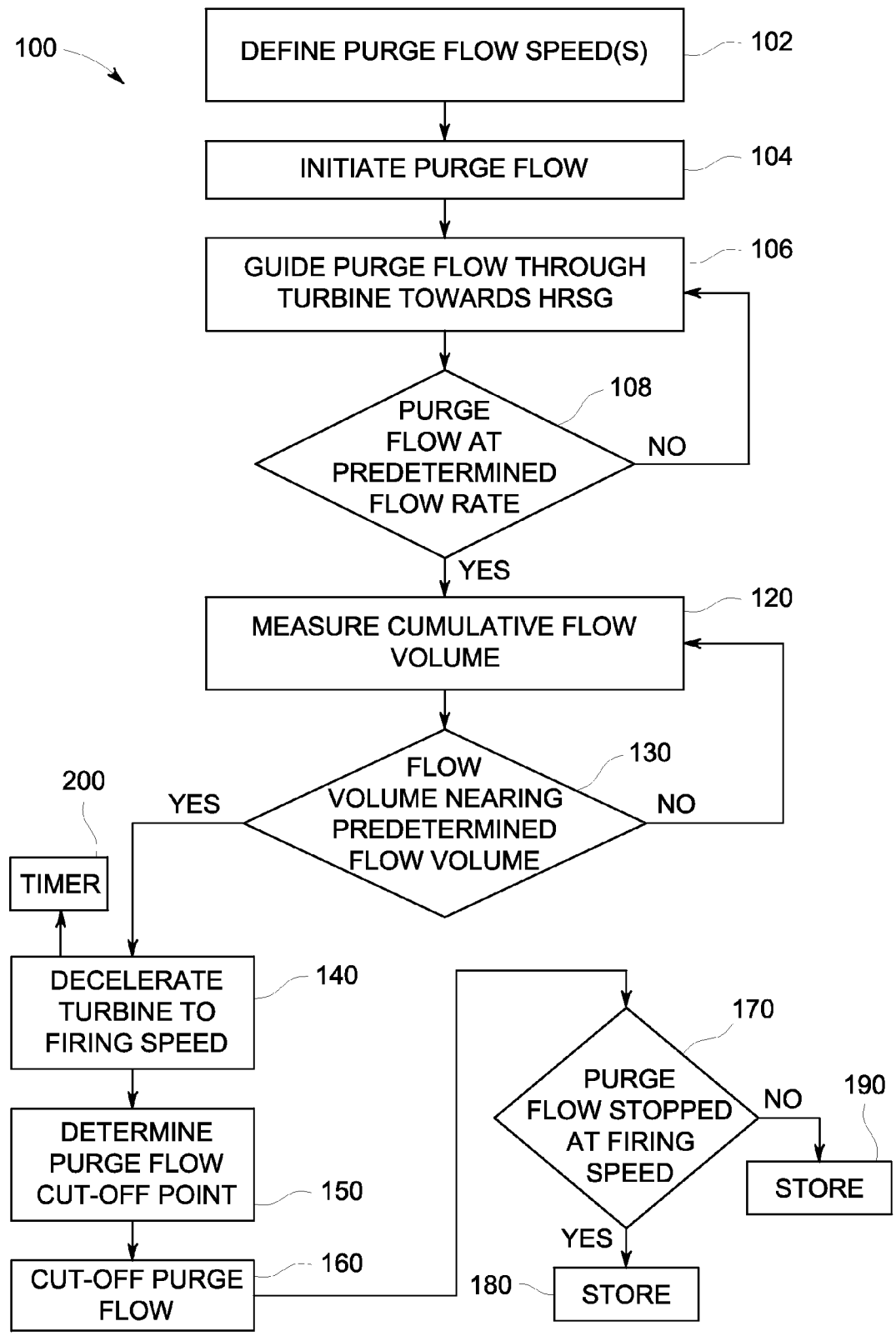
FIG. 2 is a flow chart illustrating a method of delivering purge flow through the gas turbomachine and HRSG in accordance with an exemplary embodiment.

Reference will now follow to FIG. 2 in describing a method 100 of meeting a purge requirement for power plant 2. Initially, a purge flow speed is defined for turbine portion 12 as indicated in block 102. Purge flow speed may be held at a single speed, or may include varying turbine speed, wobulating turbine speed, or operating turbine 12 at different speed levels during purge. At this point a purge flow is initiated as indicated in block 104 and guided through turbine portion 12 and toward HRSG 6 as indicated in block 106. In block 108, a determination is made whether the purge flow has achieved a predetermined flow rate. The predetermined flow rate may vary from installation to installation and from location to location. If the purge flow rate is not at the predetermined level, the purge flow is allowed to build accordingly. Once the predetermined flow rate has been achieved, adaptive purge flow system 40 monitors a cumulative flow volume passing toward HRSG 6 as indicated in block 120. Cumulative flow volume is monitored by using temperature and pressure values of the purge flow. In block 130, a determination is made whether the cumulative flow volume is nearing a predetermined flow volume. The predetermined flow volume may vary from installation to installation. In some cases, the predetermined flow volume represents a number of volume exchanges for HRSG 6. More specifically, HRSG 6 includes a defined internal volume. The predetermined flow volume would ensure that gases in the defined internal volume would be replaced one or more times.

As indicated in block 140, once the cumulative purge volume nears the predetermined flow volume, adaptive purge control system 40 causes a deceleration of turbine portion 12 from the purge speed to firing speed and determines a purge flow cut off point in block 150. In accordance with the exemplary embodiment, adaptive purge control system 40 determines a purge flow cut off point that substantially coincide with turbine portion 12 reaching firing speed. In block 160 the purge flow is cut off and a determination is made in block 170 whether the purge flow cut off substantially coincides with turbine portion 12 reaching firing speed. If the purge flow cut off did substantially coincide with turbine portion 12 reaching firing speed, adaptive purge flow control system 40 stores the purge flow cut off point data in memory 44 as a positive result as indicated in block 180. If the purge flow cut off did not substantially coincide with turbine portion 12 reaching firing speed, the purge flow cut off point is stored in memory 44 as a negative result as indicated in block 190. Adaptive purge flow control system 40 uses both the positive and negative results to adaptively determine future purge flow cut off points. Alternatively, the purge flow cut off point could be set when a timer, activated when 8% of base load flow is achieved, times out as indicated in block 200. In general, the cumulative purge flow is based at least in part on a multiple of a total HRSG volume.

At this point it should be understood that the exemplary embodiments describe a purge flow control system that "learns" or adapts to turbine speed and purge flow conditions to set a purge flow cut off point that substantially coincides with the turbine reaching firing speed. The purge flow is configured to remove potentially combustible gases from the turbine portion, the HRSG as well as any associated exhaust ducting prior to ignition of the turbomachine system. By substantially matching purge flow cut off with turbine firing speed, the purge flow control system enhances an overall operating efficiency of CCPP 2. In addition, substantially matching purge flow cut off with firing speed allows for a more open inlet gas vane (IGV) during purge, and for varying purge speeds, so as to reduce thermal stresses on the gas turbomachine and HRSG, lower costs associated with start up and decrease restart times. Finally, it should be understood that the purge volume includes, in addition to a volume of the HRSG, a volume of any associated exhaust system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of meeting a purge requirement for a gas turbomachine, the method comprising:
   generating a purge flow;
   guiding the purge flow through at least one of a combustor assembly and a turbine portion of the gas turbomachine;
   determining a cumulative purge volume passing through the one of the combustor assembly and the turbine portion of the gas turbomachine to meet a predetermined purge volume; and
   discontinuing the purge flow substantially coincident with the turbine portion reaching a firing speed once the predetermined purge volume has passed through the one of the combustor assembly and the turbine portion of the gas turbomachine.

2. The method of claim 1, further comprising:
   operating the turbine portion at a purge speed when guiding the purge flow into the at least one of the combustor assembly and turbine portion of the gas turbomachine; and
   decelerating the turbine portion from the purge speed to achieve the firing speed.

3. The method of claim 2, further comprising: selectively adjusting the purge speed.

4. The method of claim 2, wherein operating the turbine portion at the purge speed comprises wobulating the speed of the turbine portion.

5. The method of claim 2, wherein operating the turbine portion at the purge speed comprises varying the speed of the turbine portion.

6. The method of claim 1, wherein determining the purge volume includes initiating measurement of the cumulative purge volume after the purge flow reaches a predetermined flow rate.

7. The method of claim 1, further comprising: guiding the purge flow into a heat recovery steam generator (HRSG) having an HRSG volume, the cumulative purge volume being based at least in part on a multiple of the HRSG volume.

8. The method of claim 1, wherein determining the cumulative purge volume includes measuring one of a temperature and a pressure of the purge flow.

9. A method of meeting a purge flow requirement for a power plant, the method comprising:
   generating a purge flow in a gas turbomachine;
   guiding the purge flow from the gas turbomachine into a heat recovery steam generator (HRSG) fluidly coupled to the gas turbomachine;
   determining a cumulative purge volume passing through the HRSG to meet a predetermined purge volume; and
   discontinuing the purge flow substantially coincident with the turbine portion reaching a firing speed once the predetermined purge volume has passed through the HRSG.

10. The method of claim 9, further comprising:
    operating a turbine portion of the gas turbomachine at a purge speed when guiding the purge flow into the HRSG; and
    decelerating the turbine portion from the purge speed to achieve the firing speed.

11. The method of claim 10, further comprising: selectively adjusting the purge speed.

12. The method of claim 10, wherein operating the turbine portion at the purge speed comprises wobulating the speed of the turbine portion.

13. The method of claim 10, wherein operating the turbine portion at the purge speed comprises varying the speed of the turbine portion.

14. The method of claim 9 wherein determining the purge volume includes initiating measurement of the cumulative purge volume after the purge flow reaches a predetermined flow rate.

15. The method of claim 9 wherein the cumulative purge volume is based at least in part on a multiple of a volume of the HRSG volume.

16. The method of claim 9, wherein determining the cumulative purge volume includes measuring one of a temperature and a pressure of the purge flow.

17. A turbomachine comprising:
    a compressor portion;
    a turbine portion operatively connected to the compressor portion;
    a combustor assembly fluidly connected to the compressor portion and the turbine portion; and
    an adaptive purge control system operatively connected to at least one of the compressor portion and the turbine portion, the purge control system being configured and disposed to adaptively deliver a defined volume of purge flow through the turbine portion and discontinue the purge flow substantially coincident with the turbine portion reaching a firing speed.

18. The turbomachine according to claim 17 further comprising: a heat recovery steam generator (HRSG) fluidly connected to the turbine portion, the purge control system being configured and disposed to adaptively deliver the defined volume of purge flow through the HRSG.

19. The turbomachine according to claim 17, wherein the purge control system is configured and disposed to adaptively deliver the defined volume of purge flow for multiple purge flow speeds.

20. The turbomachine according to claim 17, wherein the purge control system is configured and disposed to adaptively deliver the defined volume of purge flow at varying speeds.

21. The turbomachine according to claim 17, wherein the adaptive purge control system is configured and disposed to determine a cumulative purge volume by measuring one of a temperature and a pressure of the purge flow.

\* \* \* \* \*